(12) United States Patent
Yasrebi et al.

(10) Patent No.: US 8,718,254 B2
(45) Date of Patent: May 6, 2014

(54) TECHNIQUES FOR CONFERENCE SCHEDULING

(75) Inventors: Mehrad Yasrebi, Austin, TX (US); Bernard Ku, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1381 days.

(21) Appl. No.: 11/768,770

(22) Filed: Jun. 26, 2007

(65) Prior Publication Data

US 2009/0005038 A1 Jan. 1, 2009

(51) Int. Cl.
*H04M 3/56* (2006.01)
(52) U.S. Cl.
USPC ................ 379/202.01; 455/416; 370/352
(58) Field of Classification Search
USPC ......... 709/204; 379/202.01, 205.01; 455/416; 370/260, 352
See application file for complete search history.

(56) References Cited

U.S. PATENT DOCUMENTS

| | | | |
|---|---|---|---|
| 6,088,732 A * | 7/2000 | Smith et al. | 709/229 |
| 6,427,008 B1 * | 7/2002 | Balaz | 379/202.01 |
| 2003/0014491 A1 * | 1/2003 | Horvitz et al. | 709/206 |
| 2003/0105820 A1 * | 6/2003 | Haims et al. | 709/205 |
| 2004/0001446 A1 * | 1/2004 | Bhatia et al. | 370/261 |
| 2005/0071427 A1 * | 3/2005 | Dorner et al. | 709/204 |
| 2005/0238156 A1 * | 10/2005 | Turner | 379/202.01 |
| 2006/0018267 A1 * | 1/2006 | Kobayashi et al. | 370/261 |
| 2006/0047557 A1 * | 3/2006 | Bieselin et al. | 705/9 |

* cited by examiner

*Primary Examiner* — Ahmad Matar
*Assistant Examiner* — Jirapon Intavong
(74) *Attorney, Agent, or Firm* — Akerman LLP; Michael K. Dixon; Roy P. Zachariah

(57) ABSTRACT

A technique for scheduling conferences includes receiving a conference request, which includes an invitee list, a prioritized list of preferred media types, and one or more times for a conference associated with the conference request. The conference is requested with respective invitees associated with the invitee list (via respective subscriber terminals) and it is determined whether the respective invitees can be scheduled for the conference. The conference is scheduled between a conference requester (associated with the conference request) and available ones of the respective invitees, when mandatory attendees, included within the respective invitees, are available.

18 Claims, 2 Drawing Sheets

TECHNIQUES FOR CONFERENCE SCHEDULING

FIELD OF THE DISCLOSURE

The present disclosure is generally directed to scheduling and, more particularly, to techniques for conference scheduling.

BACKGROUND

In general, an Internet protocol multimedia subsystem (IMS) provides a framework for delivering Internet protocol (IP) multimedia communication services to wireless and wireline subscriber terminals. A typical IMS network employs an IP-based protocol (e.g., session initiation protocol (SIP)) to facilitate integration with the Internet. In general, an IMS network facilitates access of multimedia and voice applications across wireless and wireline subscriber terminals. IMS employs a horizontal control layer that isolates an access network from a service layer. Alternative and overlapping technologies for providing access and provisioning of services across wired and wireless networks generally include some combination of a generic access network, softswitches, and some variation of SIP. In a typical implementation, an IMS network includes a collection of different functions that are linked by standardized interfaces. A subscriber can connect to an IMS network using various methods that employ a standard IP.

Subscriber terminals, such as mobile telephones, personal digital assistants (PDAs), and computers, can normally register directly into an IMS network, even when the subscriber terminals are roaming in another network. Typically, the only requirement is that a subscriber terminal use Ipv4 (or Ipv6) and run SIP user agents. An IMS network may typically support fixed access (e.g., digital subscriber line (DSL), cable modems, Ethernet, etc.), mobile access (wideband code division multiple access (W-CDMA), CDMA2000, global system for mobile communications (GSM), general packet radio service (GPRS), etc.), and wireless access (wireless local area network (WLAN), worldwide interoperability for microwave access (WiMAX), etc.). IMS networks usually support other telephone systems, such as plain old telephone service (POTS), H.323, and IMS incompatible voice over IP (VoIP) systems, through gateways.

A typical IMS network includes a home subscriber server (HSS) that implements a subscriber database, which supports IMS network entities that handle calls/sessions. The HSS typically maintains subscription-related information (e.g., subscriber profiles) that is used to perform authentication and authorization, and can be used to provide information about a physical location of a subscriber. An IMS network usually implements private and public subscriber identities, known as an IP multimedia private identity (IMPI) and an IP multimedia public identity (IMPU). The IMPI and the IMPU are uniform resource identifiers (URIs) that can be digits (e.g., the telephone URI tel:+1-512-123-4567) or alphanumeric identifiers (e.g., the SIP URI sip:jane.doe@example.com). An IMPI is unique to a subscriber terminal (e.g., a telephone), which may have multiple IMPUs (e.g., a telephone URI and an SIP URI) per IMPI. An IMPU can be shared between telephones, so both telephones can be reached with the same identity (e.g., a single telephone number for an entire family).

An IMS network may implement multiple SIP servers, which may be collectively referred to as call session control functions (CSCFs). The CSCFs are used to process SIP signaling packets. A proxy CSCF (P-CSCF) is usually an SIP server that is the first point of contact for a subscriber terminal. Some IMS networks may implement a session border controller (SBC) to implement the functionality of the P-CSCF. In a typical implementation, a subscriber terminal discovers a P-CSCF with a dynamic host configuration protocol (DHCP), or is assigned to a P-CSCF during registration. The P-CSCF may inspect every message from/to a subscriber terminal and usually authenticates and establishes a security association with a subscriber terminal to prevent spoofing and replay attacks and to protect the privacy of a subscriber. In a typical implementation, other nodes of the IMS network trust the P-CSCF and, as such, do not have to re-authenticate the subscriber terminal. The P-CSCF may also compress and decompress SIP messages to reduce utilized bandwidth over communication links.

A P-CSCF may also employ a policy decision function (PDF) that authorizes media plane resources, e.g., quality of service over the media plane for policy control, bandwidth management, etc. In a typical IMS network, one or more serving-CSCFs (S-CSCFs) are employed as a central node in the signaling plane. The S-CSCF normally functions as an SIP server and also performs session control. The S-CSCF is usually always located in the home network. The S-CSCF may employ Diameter interfaces to the HSS (to download and upload user profiles) and usually handles SIP registrations, which allows the S-CSCF to bind to the subscriber. The S-CSCF may inspect all signaling messages and is usually configured to decide to which application server(s) an SIP message will be forwarded. The S-CSCF typically provides routing services (e.g., telephone number mapping (ENUM) look-ups) and can enforce policies of a network operator. In a typical IMS network, multiple S-CSCFs may be employed for load distribution and availability. Usually, in an IMS network, an HSS assigns the S-CSCF to a subscriber terminal when it is queried by an interrogating-CSCF (I-CSCF).

An I-CSCF is an SIP function that is located at the edge of an administrative domain. An IP address of an I-CSCF is maintained (e.g., using naming authority pointer (NAPTR) types of DNS records) in a domain name system (DNS) of the administrative domain. In this manner, remote servers can locate an I-CSCF and use the I-CSCF as a forwarding point for SIP packets to the administrative domain. The I-CSCF usually queries an HSS to retrieve subscriber-related information and routes SIP requests to an assigned S-CSCF. The entry point function may be removed from the I-CSCF and included within an interconnection border control function (IBCF), which may provide a gateway to external networks, and provide network address translation (NAT) and firewall functions.

In an IMS network, application servers (ASs) host and execute services and interface with the S-CSCF using, for example, SIP. Depending on the service provided by an AS, the AS may operate in SIP proxy mode, SIP user agent mode, or SIP back-to-back user agent (B2BUA) mode. An AS may be located in a home network or in an external network. If located in the home network, an AS can query the HSS using a Diameter interface.

An IMS network also typically includes one or more media servers, which implement media resource functions (MRFs). An MRF is designed to provide a source of media in a home network. For example a media server may: play audio/video announcements; facilitate multimedia conferencing by, for example, mixing audio streams; perform text-to-speech conversion and speech recognition; and perform real-time transcoding of multimedia data (e.g., conversion between different codecs). MRFs may be further divided into a media resource function control (MRFC) and a media resource function processor (MRFP). The MRFC usually functions as a signaling plane node that acts as an SIP user agent to the S-CSCF and may control the MRFP via, for example, a H.248 interface. The MRFP usually functions as a media plane node that implements media-related functions.

An IMS network may also include one or more breakout gateways (BGs). A BG provides a breakout gateway control function (BGCF), which functions as an SIP server that performs routing functionality, based on telephone numbers. The BGCF is usually only used when calling from the IMS network to a telephone in a circuit switched (CS) network, such as a public switched telephone network (PSTN) or a public land mobile network (PLMN). A PSTN gateway interfaces the IMS network with a PSTN network.

An ENUM database may be used, for example, in conjunction with a DNS database to resolve Internet namespaces for voice over Internet protocol (VoIP) subscriber terminals. More broadly, an ENUM database may be used to map a dialed telephone number to an SIP/telephone uniform resource identifier (URI), an email address URI, an instant messaging (IM) URI (for presence or chat), a website address, etc. In an IMS network, an ENUM server may implement a combined ENUM/DNS database. In a typical IMS implementation, a S-CSCF that is serving a calling party queries an ENUM server to resolve a called party E.164 international telephone number to an SIP URI for a VoIP subscriber terminal of a called party. As mentioned above, an HSS stores detailed information about a subscriber and a name/address of a S-CSCF to which each subscriber terminal is registered (and served by). When a VoIP subscriber terminal is turned on, the terminal automatically looks for a serving IMS network and tries to connect to a P-CSCF. The VoIP subscriber terminal then sends out an SIP register message to the HSS to become a registered VoIP subscriber terminal. When a subscriber using a VoIP subscriber terminal places a call, a call signal (SIP invite message) first reaches a S-CSCF to which the terminal has registered (which is known as the originating S-CSCF). The originating S-CSCF then queries an ENUM server in an attempt to convert a called party E.164 international telephone number into an SIP URI for the called party terminal. The originating S-CSCF then forwards the call signal (SIP invite) to an interrogating-CSCF (I-CSCF), which forwards the call signal to a terminating S-CSCF. The terminating S-CSCF forwards the call signal to the subscriber terminal of the called party to set up the end-to-end call path between the calling and called parties.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION OF THE DRAWINGS

Figure 1:
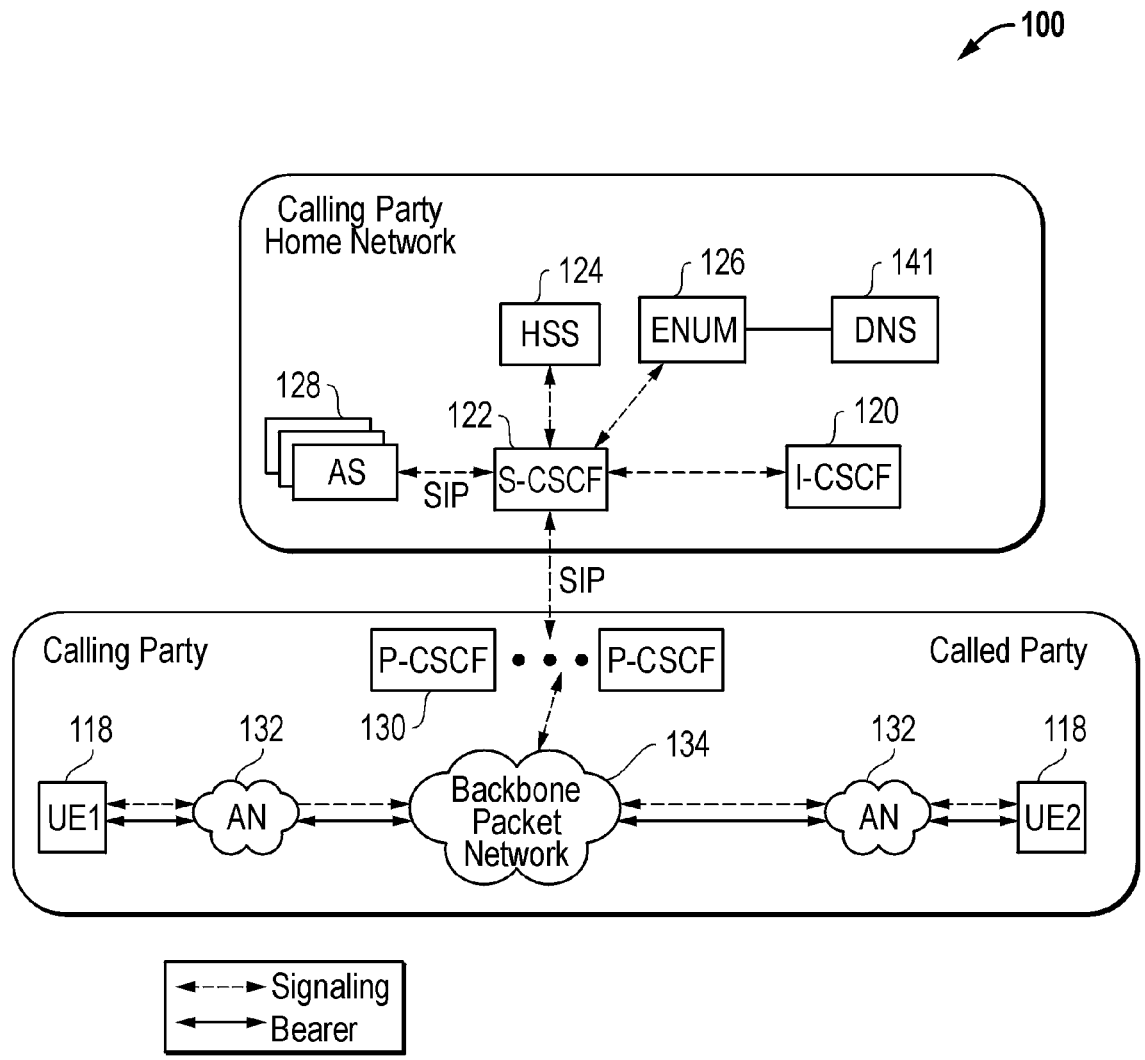
FIG. 1 is a block diagram of an example Internet protocol multimedia subsystem (IMS) network that may be configured according to an embodiment of the present disclosure.

In general, conventional conference scheduling is inefficient, slow, and does not provide support for mobile subscribers that may be required to attend an important conference meeting that is setup with a short lead-time. Typically, conventional conference scheduling has involved a significant number of manual procedures, including executive assistant human involvement, and has not utilized available network information. Moreover, conventional conference scheduling has not supported distinct media types or selection of available conferencing facilities, based on conference organizer specified conditions. Additionally, conventional conference scheduling has not supported real-time operations facilitated by convergent service information and also has not supported integration or sale of convergent network services, such as IMS ENUM servers, IMS Presence Servers, IMS subtending services (e.g., automatically using instant messaging (IM) to mobile users to indicate the need to evaluate and respond to an urgent conference set-up request), and data center application servers.

Various embodiments of the present disclosure are directed to autonomous multimedia conference scheduling using convergent network services. According to one aspect of the present disclosure, an autonomous conferencing agent (ACA) is disclosed that is capable of accessing a telephone number mapping (ENUM) server, an IMS Presence Server, and calendars of various subscriber terminals to schedule multimedia conferences among subscribers. According to one or more aspects, techniques are disclosed that substantially automate conference scheduling in real-time. According to at least one embodiment, convergent network services are integrated to automate manual steps and support conference establishment for mobile users. The disclosed techniques generally support discovery and utilization of conference bridges that are specific to a desired media type requested by a conference organizer and supported by conference invitees. Moreover, the techniques facilitate urgent conference scheduling of a variety of subscribers, e.g., mobile subscribers. The techniques disclosed herein generally facilitate streamlined multimedia conference scheduling across time-zones (e.g., international video conferences) in an expedient manner.

According to various aspects of the present disclosure, conditions for conference scheduling can be based on one or more of the following: media type (e.g., video, audio, text); start time range; minimum duration; maximum duration; and a particular type of conference bridge. In general, any condition that can be articulated and programmed (using if then, else, AND, and OR statements) can be presented via an application program interface (API). Conference bridges may be selected based on various conference organizer specified factors, e.g., functionality, security, cost, location, etc. A conference organizer can specify a required media type, which may be supported by only some (e.g., one or more) but not all available conference bridges. An ACA may automatically select a bridge based on the organizer specified factors. As one example, assume that conference bridges having the following capabilities are available: conference bridge 1 provides video conferencing; conference bridge 2 provides secure video conferencing; conference bridge 3 provides audio only conferencing; conference bridge 4 provides chat room conferencing; and conference bridge 5 provides secure video conferencing.

In this case, an ACA (or conferencing agent) may select one of the conference bridges based on additional information supplied by a conference organizer. For example, the organizer may specify that a secure conferencing facility (e.g., at a company executive briefing center) is required and also specify mandatory and non-mandatory (optional) attendees, e.g., attendance of invitee 1 is mandatory, attendance of invitee 2 is optional, and attendance of invitee 3 is optional.

The organizer may also specify a time (e.g., Monday, sometime between 3:00 to 5:00 p.m., or Feb. 18, 2007, 30 minutes), as well as ENUM contact and presence information. An ACA may, for example, determine the following: invitee 1 has e-mail and IM addresses and is currently present on IM (according to an IMS Presence Server); invitee 2 has an email address; and invitee 3 only has a VoIP SIP address (according to a telephone number provided to an ENUM server). In the example above, an ACA may examine time availability on bridge 1 and 5 and determine that only bridge 5 is available during a selected time.

The ACA may then employ e-mail (with links to web pages of an ACA, which may be deployed on an application server of an IMS network) to invite invitees 1 and 2 to the conference. The ACA may use instant messaging (IM) to send an IM message to invitee 1 to go to an ACA web page for urgent conference information. The ACA may uses a VoIP telephone number of invitee 3 to call and play one or more interactive voice response (IVR) messages regarding the invitation and receive input from invitee 3 regarding acceptance of the conference. Invitee contacts can be repeated multiple times over a given time period to increase the possibility of contact. If mandatory attendees accept the conference terms (including the ability to join the conference location/facility locally or remotely), then the conference is scheduled successfully.

According to one aspect of the present disclosure, a technique for scheduling conferences includes receiving a conference request, which includes an invitee list, a prioritized list of preferred media types, and one or more times for a conference associated with the conference request. The technique also includes requesting the conference with respective invitees associated with the invitee list (via respective subscriber terminals) and determining whether the respective invitees can be scheduled for the conference. The technique further includes scheduling the conference between a conference requestor associated with the conference request and available ones of the respective invitees, when mandatory attendees (included within the respective invitees) are available.

According to another aspect of the present disclosure, a communication system includes multiple subscriber terminals and an application server. The application server is in communication with the multiple subscriber terminals and is configured to execute a conferencing agent that is configured to receive a conference request from a conference requester subscriber terminal, included within the multiple subscriber terminals. The conference request may include an invitee list, a prioritized list of preferred media types, one or more times, and one or more conditions for a conference associated with the conference request. The conferencing agent is also configured to request the conference with respective invitees associated with the invitee list, via respective ones of the multiple subscriber terminals. The conferencing agent is further configured to determine whether the respective invitees can be scheduled for the conference and schedule the conference between a conference requestor associated with the conference request and available ones of the respective invitees, when mandatory attendees (included within the respective invitees) are available.

According to a different aspect of the present disclosure, a technique for conference scheduling includes requesting an invitee device list associated with respective subscriber terminals from an Internet protocol multimedia subsystem telephone number mapping server. The technique also includes receiving the invitee device list from the Internet protocol multimedia subsystem telephone number mapping server. Finally, a conference with respective invitees is requested via the respective subscriber terminals based on the invitee device list.

FIG. 1 shows a relevant portion of an example Internet protocol (IP) multimedia subsystem (IMS) network 100 that includes multiple proxy call session control functions (P-CSCFs) 130, an interrogating CSCF (I-CSCF) 120, a serving CSCF (S-CSCF) 122, a home subscriber server (HSS) 124, a telephone number mapping (ENUM) server 126, a domain name system (DNS) server 141, multiple application servers (ASs) 128, multiple access networks (ANs) 132, a backbone packet network 134, and multiple user equipment (UE) devices (or subscriber terminals) 118, denoted as UE1 and UE2. The subscriber terminals 118 may be configured to connect to other circuit-switched or packet-switched networks (not shown). Signaling and bearer activities are depicted by dashed and solid lines, respectively, between the subscriber terminals 118, denoted as UE1 and UE2.

The ENUM server 126 resolves E.164 international telephone numbers to one or more uniform resource identifiers (URIs) and may provide other DNS related services. Typically, naming authority pointer (NAPTR) records are used for translating E.164 addresses to other addresses, e.g., SIP addresses. The P-CSCFs 130 may act as session initiation protocol (SIP) proxies that serve as a first point of contact to the subscriber terminals 118. The I-CSCF 120 is an SIP proxy that can, among other functions, query the HSS 124 to retrieve locations for the subscriber terminals 118 and route SIP calls to the S-CSCF 122. The S-CSCF 122 usually functions as an SIP server that can handle SIP registrations, which allows the subscriber terminals 118 to be bound to a location. The S-CSCF 122 can also decide which particular one of the ASs 128 to forward an SIP message to in order to provide a subscriber desired service. For example, one of the ASs 128 may function as an IMS Presence Server and another of the ASs 128 (or the same AS) may implement a conferencing agent, configured according to one or more embodiments of the present disclosure. The ASs 128 can also provide routing services using ENUM look-ups, and can enforce the policy of an operator of the IMS network 100. The ASs 128 may also host and execute value-added IMS services (e.g., caller identification (ID), call waiting, push-to-talk, etc.).

After registration, the HSS 124 (or one of the ASs 128) may send instructions to the ENUM server 126 to create or modify a selected naming authority pointer (NAPTR) record or records. As is well known, a NAPTR record is a type of domain name system (DNS) record that supports regular expression (RE) based rewriting. In this case, several NAPTR records may be chained together to create relatively sophisticated rewriting rules. It should be appreciated that a record may go through a number of rewrites. For example, the telephone number +1-512-555-1212 may be translated into the URI 2.1.2.1.5.5.5.2.1.5.1.e164.arpa as described by E.164, which defines the international public telecommunication numbering plan used in the PSTN and some other data networks. A dynamic delegation discovery system (DDDS) may then be employed to transform the URI using rewrite rules gathered from NAPTR records. For example, a Berkley Internet name domain (BIND) configuration for the records returned from a query for the URI 2.1.2.1.5.5.5.2.1.5.1.e164.arpa may be provided as follows:

$ORIGIN 2.1.2.1.5.5.5.2.1.5.1.e164.arpa.

IN NAPTR 100 10 "u" "E2U+sip" "!^.*$!sip: information@pbx.example.com!".

IN NAPTR 102 10 "u" "E2U+email" "!^.*$!mailto: information@example.com!".

In the two URIs above, the first record has an order value of 100 which is lower than 102 and, as such, is picked first. In this case, the preference of 10 is ignored as no other rules have an order of 100. The "u" signifies a terminal rule in ENUM and URI applications, such that the output of the rewrite is the desired answer. If the service designated with the key "sip+E2U" is supported, other rules with higher-order values are not investigated. The regular expression (RE) "!^.*$!sip:information@pbx.example.com!" is used to transform the original query of 2.1.2.1.5.5.5.2.1.5.1.e164.arpa into sip:information@pbx.example.com. In the RE, the exclamation mark '!' is a delimiter and the sequence "^.*$" indicates the start of the RE. In the example above, if SIP is not supported, "mailto:information@example.com" may be utilized as a fall-back.

Figure 2:
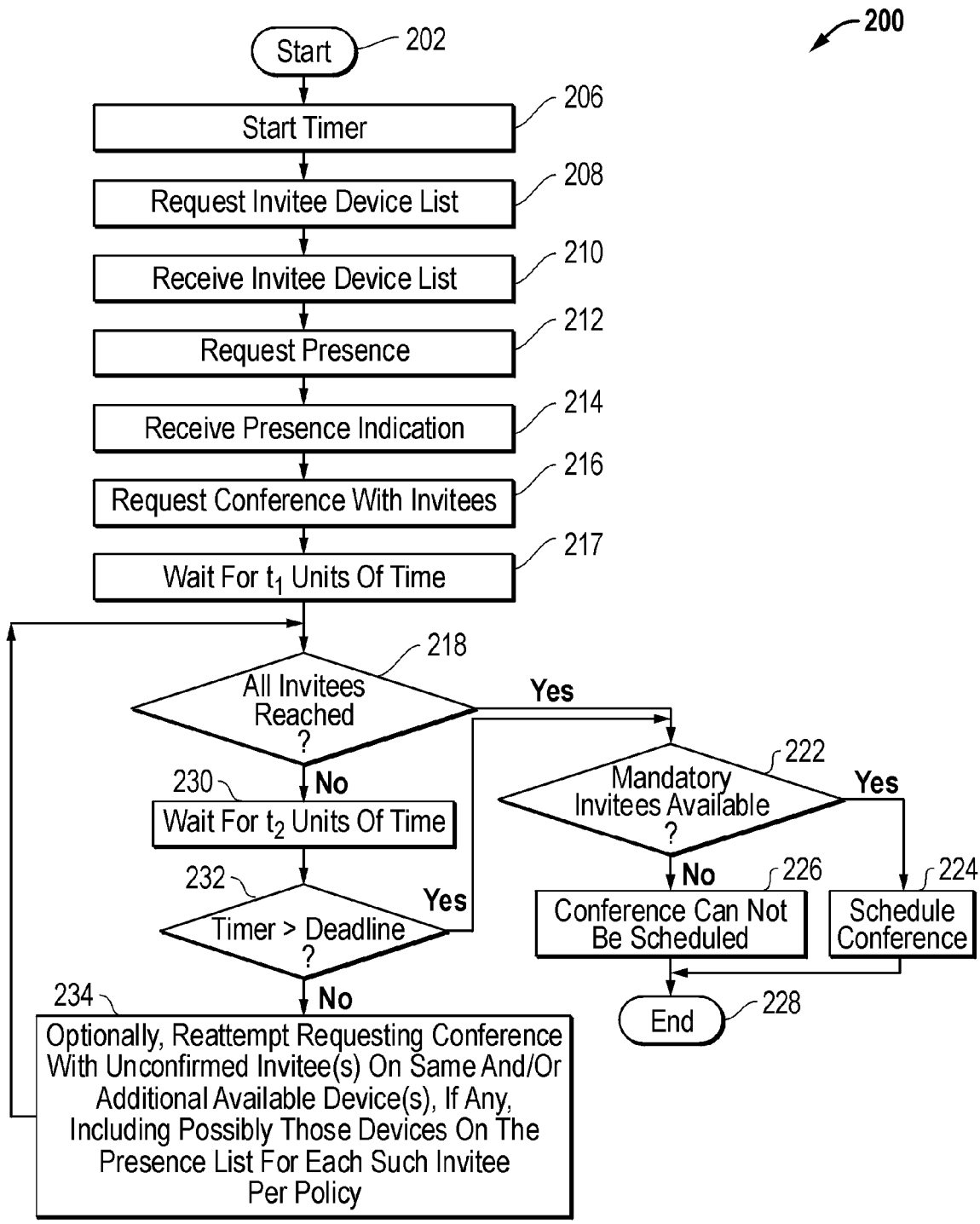
FIG. 2 shows a flow chart of an example conference scheduling process according to an embodiment of the present disclosure.

FIG. 2 shows a flow chart of an example conference scheduling process 200 that is configured according to an embodiment of the present disclosure. In a typical implementation, the process 200 is implemented by an autonomous conferencing agent (ACA) that is executing on one of the ASs 128. The process 200 is initiated in block 202, at which point control transfers to block 206, where a timer that is used to track whether conference invitees have responded to a conference request in an allocated time (i.e., $t_1$ units of time, e.g., five minutes) is started. Then, in block 208, an invitee device list is requested by the AS 128 (that is executing the ACA) from, for example, the ENUM server 126. Next, in block 210, the AS 128 receives the invitee device list, which includes NAPTR records associated with each of the respective invitees. Then, in block 212, the AS 128 requests a presence indication from an IMS Presence Server for the invitees. The IMS Presence Server may be, for example, implemented on one of the ASs 128.

Next, in block 214, the ACA receives one or more presence indications for each of the invitees. The ACA may then utilize the presence indications to determine how best to communicate with each of the given invitees, when attempting to setup a conference. The ACA may, for example, attempt to contact mobile subscriber terminals using IM. Then, in block 216, the ACA requests (using email, IM, voice, etc.) the conference with each of the invitees, based on the criteria established by the conference organizer. Next, in block 217, the ACA waits $t_1$ units of time to allow the invitees time to respond. Then, in decision block 218, the ACA determines whether all of the invitees can be reached for the conference (i.e., whether all of the invitees are reachable via respective subscriber terminals). If all of the invitees are reachable (capable of being scheduled) in block 218, control transfers to decision block 222, where the ACA determines whether mandatory attendees have indicated their availability (i.e., whether the mandatory attendees have responded affirmatively to the conference request by, for example, responding via a web page associated with the ACA or by responding via an IVR system associated with the ACA).

If the mandatory attendees are available in block 222, control transfers to block 224, where the conference is scheduled. The ACA may also update one (or more) electronic calendar(s) of a subscriber to reflect the scheduled conference, if such calendar(s) is (are) accessible to the ACA. If the mandatory attendees are not available in block 222, control transfers to block 226, where the conference is canceled (by, for example, sending messages to subscriber terminals of the conference organizer and the conference invitees). From blocks 224 and 226, control transfers to block 228, where the process 200 ends. In block 218, if all of the invitees have not all responded, control transfers to block 230, where the ACA waits for $t_2$ units of time (e.g., two minutes) to provide more time for the invitees to respond. In a typical case, the parameters $t_1$ and $t_2$ may also be influenced by the Deadline, which is usually selected by a conference organizer. Next, in block 232, the ACA determines whether the timer has exceed a deadline for scheduling the conference (for example, the deadline may correspond to the time at which the requested conference was to begin). If the timer has exceeded the deadline in block 232, control transfers to block 222. If the timer has not exceeded the deadline in block 232, control transfers to block 234. In block 234, the ACA optionally re-attempts requesting the conference with one or more unconfirmed invitees on the same subscriber terminals or additional subscriber terminals, if any, associated with an unconfirmed invitee (as set forth in the device list for a given subscriber). Depending on the policy setup by the conference organizer, the ACA may attempt to communicate with unconfirmed invitees using the subscriber devices indicated available from the presence list. Following block 234, control transfers to block 218.

As noted above, conventional conference scheduling techniques have not supported multimedia-based conferences (e.g., audio, video, chat) over available services without significant human intervention. Moreover, conventional conference scheduling techniques have not significantly automated conference scheduling procedures, have been unable to reliably schedule conferences on short notice, and have been unable to automatically discover available conference bridges with desired attributes (e.g., privacy, encryption, location, etc.). In addition, conventional conference scheduling techniques have been unable to autonomously and automatically engage international and mobile users to facilitate suitable conference facilities and schedules.

As noted above, according to various aspects of the present disclosure, conference bridges may be selected based on conference organizer specified factors, e.g., security, cost, location, etc. For example, an ACA may select a conference location based on a current location (as indicated by a subscriber terminal of a given invitee via, for example, GPS, cell location, etc.) of a given invitee. A conference organizer can specify a required media type, which may be supported by only some (e.g., one or more) but not all conference bridges. An ACA, configured according to the present disclosure, may then automatically select a bridge based on the organizer specified factors. As is also noted above, presence may be used in an attempt to contact conference invitees (e.g., mobile invitees) for urgent conferences. Overlapped times may be employed to determine and schedule a conference. Customized contact schemes (per ENUM server and IMS Presence Server interfaces) that are afforded by IMS may be employed to increase the possibility of success in setting up conferences. Various interfaces (e.g., IVR, web pages, etc.) may be provided to conference invitees to receive responses regarding a conference invitation.

According to various embodiments, preferred and possible media types may be automatically determined based on organizer conditions, invitee responses, and invitee availability. As is disclosed herein, interfaces to IMS functions are utilized in a unique manner to eliminate many manual, slow and error-prone steps from the conference scheduling process. In one or more embodiments, the conference scheduling process is streamlined by employing IMS services and web application servers with decision support systems in combination with an autonomous conferencing agent to provide enhanced multimedia conferencing services. It should be appreciated that the disclosed techniques are readily extensible to a variety of media types and a variety of different networks.

Accordingly, techniques have been disclosed herein that provide improved techniques for scheduling conferences. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for scheduling conferences, comprising:
  receiving a conference request, the conference request including an invitee list, a prioritized list of preferred media types, and a time for a conference associated with the conference request;
  requesting a presence of respective subscriber terminals associated with respective invitees associated with the invitee list from an internet protocol multimedia subsystem presence server;
  receiving presence indications of the respective subscriber terminals from the internet protocol multimedia subsystem presence server;
  receiving an invitee device list associated with the subscriber terminals, wherein the invitee device list includes a naming authority pointer record that translates addresses of the subscriber terminals into session initiation protocol addresses for reaching the subscriber terminals;
  determining a mode of communication for requesting the conference with the respective invitees via the respective subscriber terminals based on the presence indications;
  requesting the conference with the respective invitees associated with the invitee list via the respective subscriber terminals as referred to in the invitee device list via the determined mode of communication;
  determining whether the respective invitees can be scheduled for the conference based on whether the respective invitees are reachable via the respective subscriber terminals;
  determining whether a timer has exceeded a deadline for scheduling the conference;
  scheduling the conference between a conference requestor associated with the conference request and available ones of the respective invitees when mandatory attendees, included within the respective invitees, are available and if the timer has exceeded the deadline for scheduling the conference; and
  attempting to communicate with unconfirmed invitees using the subscriber terminals devices that are indicated as being available from a presence list when the timer has not exceeded the deadline for scheduling the conference.

2. The method of claim 1, wherein the respective invitees include a first invitee and the determining further comprises:
  indicating that the first invitee cannot be scheduled for the conference when the first invitee does not respond within a timeout period.

3. The method of claim 1, wherein the respective invitees include a first invitee, the respective subscriber terminals include a first subscriber terminal associated with the first invitee, and the determining further comprises:
 accessing an electronic calendar associated with the first subscriber terminal to determine whether the first invitee is available for the conference.

4. The method of claim 1, further comprising:
 requesting the invitee device list associated with the respective subscriber terminals from an internet protocol multimedia subsystem telephone number mapping server;
 receiving the invitee device list from the internet protocol multimedia subsystem telephone number mapping server; and
 requesting the conference with the respective invitees associated with the invitee list via the respective subscriber terminals based on the invitee device list.

5. The method of claim 1, wherein the conference request also includes conditions that include a list of the mandatory attendees, a first timeout period, and a second timeout period, and wherein the first timeout period is used when a minimum number of the mandatory attendees have not accepted the conference within the first timeout period and the second timeout period is used when the minimum number of the mandatory attendees have accepted conference within the first timeout period, where the second timeout period is longer than the first timeout period.

6. The method of claim 1, further comprising:
 reserving a conference bridge for the conference based on the prioritized list of preferred media types; and
 confirming the conference with the conference requestor and the mandatory attendees.

7. The method of claim 1, wherein at least one of the respective subscriber terminals is a mobile subscriber station.

8. The method of claim 1, further comprising:
 selecting an available conferencing facility based on the prioritized list of preferred media types.

9. A communication system, comprising:
 multiple subscriber terminals; and
 an application server in communication with the multiple subscriber terminals, wherein the application server executes a conferencing agent that performs operations comprising:
  receiving a conference request from a conference requestor subscriber terminal that is included within the multiple subscriber terminals, the conference request including an invitee list, a prioritized list of preferred media types, a time, and conditions for a conference associated with the conference request;
  receiving an invitee device list associated with the subscriber terminals, wherein the invitee device list includes a naming authority pointer record that translates addresses of the subscriber terminals into session initiation protocol addresses for reaching the subscriber terminals;
  requesting a presence of respective subscriber terminals associated with respective invitees associated with the invitee list from an internet protocol multimedia subsystem presence server;
  receiving presence indications of the respective subscriber terminals from the internet protocol multimedia subsystem presence server;
  determining a mode of communication for requesting the conference with the respective invitees via the respective subscriber terminals based on the presence indications;
  requesting the conference with the respective invitees associated with the invitee list via respective ones of the multiple subscriber terminals via the determined mode of communication;
  determining whether the respective invitees can be scheduled for the conference;
  determining whether a timer has exceeded a deadline for scheduling the conference;
  scheduling the conference between a conference requestor associated with the conference request and available ones of the respective invitees when mandatory attendees, included within the respective invitees, are available and if the timer has exceeded the deadline for scheduling the conference; and
  attempting to communicate with unconfirmed invitees using the subscriber terminals that are indicated as being available from a presence list when the timer has not exceeded the deadline for scheduling the conference, wherein the conferencing agent autonomously requests the conference, determines whether the respective invitees can be scheduled, schedules the conference, and attempts to communicate with unconfirmed invitees without additional interaction from a user.

10. The communication system of claim 9, wherein the respective invitees include a first invitee and the operations further comprise:
 indicating that the first invitee cannot be scheduled for the conference when the first invitee does not respond within a timeout period.

11. The communication system of claim 9, wherein the respective invitees include a first invitee, the respective subscriber terminals include a first subscriber terminal associated with the first invitee, and the operations further comprise:
 accessing an electronic calendar associated with the first subscriber terminal to determine whether the first invitee is available for the conference.

12. The communication system of claim 9, wherein the operations further comprise:
 requesting the invitee device list associated with the respective subscriber terminals from an internet protocol multimedia subsystem telephone number mapping server;
 receiving the invitee device list from the internet protocol multimedia subsystem telephone number mapping server; and
 requesting the conference with the respective invitees associated with the invitee list via the respective subscriber terminals based on the invitee device list.

13. The communication system of claim 9, wherein the conditions includes a list of the mandatory attendees, a first timeout period, and a second timeout period, and wherein the first timeout period is used when a minimum number of the mandatory attendees have not accepted the conference within the first timeout period and the second timeout period is used when the minimum number of the mandatory attendees have accepted conference within the first timeout period, where the second timeout period is longer than the first timeout period.

14. The communication system of claim 9, wherein the operations further comprise:
 reserving a conference bridge for the conference based on the prioritized list of preferred media types; and
 confirming the conference with the conference requestor and the mandatory attendees via the respective subscriber terminals.

15. The communication system of claim 9, wherein at least one of the multiple subscriber terminals is a mobile subscriber station.

16. The communication system of claim 9, wherein the operations further comprise:
    selecting an available conferencing facility based on the prioritized list of preferred media types.

17. A method for conference scheduling, comprising:
    requesting an invitee device list associated with respective subscriber terminals from an internet protocol multimedia subsystem telephone number mapping server, wherein the invitee device list includes a naming authority pointer record that translates addresses of the subscriber terminals into session initiation protocol addresses for reaching the subscriber terminals;
    receiving the invitee device list from the internet protocol multimedia subsystem telephone number mapping server;
    requesting a presence of respective subscriber terminals associated with respective invitees associated with the invitee device list from an internet protocol multimedia subsystem presence server;
    receiving presence indications of the respective subscriber terminals from the internet protocol multimedia subsystem presence server;
    determining a mode of communication for requesting the conference with the respective invitees via the respective subscriber terminals based on the presence indications, wherein the mode of communication is instant message when the respective subscriber terminals are mobile subscriber terminals;
    requesting a conference with respective invitees via the respective subscriber terminals based on the invitee device list via the determined mode of communication;
    determining whether a timer has exceeded a deadline for scheduling the conference;
    scheduling the conference if the timer has exceeded the deadline for scheduling the conference; and
    attempting to communicate with unconfirmed invitees using the subscriber terminals that are indicated as being available from a presence list when the timer has not exceeded the deadline for scheduling the conference.

18. The communication system of claim 9, wherein the operations further comprise:
    selecting an available conferencing facility based on a location of one of the multiple subscriber terminals with respect to the available conferencing facility.

\* \* \* \* \*